United States Patent [19]
Argentine et al.

[11] 4,129,815
[45] Dec. 12, 1978

[54] POSTAL METER ACTUATOR

[75] Inventors: Jeffery C. Argentine, Santa Rosa; Darrell B. Minton, Sebastopol, both of Calif.

[73] Assignee: National Controls, Inc., Santa Rosa, Calif.

[21] Appl. No.: 721,983

[22] Filed: Sep. 10, 1976

[51] Int. Cl.$^2$ .............................................. G05B 19/28
[52] U.S. Cl. ................................... 318/601; 318/666; 318/15; 198/502
[58] Field of Search ............... 318/601, 602, 685, 696, 318/666, 574, 15; 198/502–505; 177/1; 93/73

[56] References Cited

U.S. PATENT DOCUMENTS

| | | | |
|---|---|---|---|
| 2,870,288 | 1/1959 | Schmidt | 318/15 X |
| 3,307,083 | 2/1967 | Pegard | 318/574 X |
| 3,402,836 | 9/1968 | Debrey et al. | 318/602 X |
| 3,659,174 | 4/1972 | Bodin | 318/602 |

OTHER PUBLICATIONS

*Control Systems*, Sep. 1971, "Stepping Motor Survey," pp. 87–88.

*Primary Examiner*—B. Dobeck
*Attorney, Agent, or Firm*—Flehr, Hohbach, Test, Albritton & Herbert

[57] ABSTRACT

Actuator for operating the arcuately moving levers of a postal meter in accordance with output signals from a computing postal scale. The actuator includes drive shoes which engage the levers and are driven along a linear path generally parallel to the arcuate path of the levers. The drive shoes are advanced and retracted by lead screws driven by stepping motors to move the levers in incremental steps. Position encoders provide signals indicative of the positions of the levers, and these signals are combined with the signals from the scale to control the operation of the actuator.

9 Claims, 2 Drawing Figures ically curved path 13. One such lever is generally provided for each digit of postage, and a typical meter might include levers for the units, tens and hundreds digits. Each lever typically has ten operational positions, corresponding to the values 0–9, which are established by a detent mechanism in the meter. For clarity of illustration, only one lever and the portion of the actuator associated therewith are shown in FIG. 1. It will be understood, however, that any desired number of levers can be driven, the drive mechanism being the same for each.

POSTAL METER ACTUATOR

BACKGROUND OF THE INVENTION

This invention pertains generally to weighing and mailing equipment and more particularly to an actuator for operating the postage setting levers of a postal meter.

Postal meters of the type commonly used for applying postage to letters and other forms of mail generally have manually operable levers for setting the value of postage to be applied. The tips of the levers generally extend from a housing for movement along an arcuately curved path, and each lever typically has a plurality of discrete operational positions corresponding to different values of postage spaced along the path.

In recent years, computing postal scales have been developed for weighing an object and automatically determining the postage for the object. One such scale is described in U.S. Pat. No. 3,951,221, issued Apr. 20, 1976 to the assignee herein.

SUMMARY AND OBJECTS OF THE INVENTION

The invention provides an actuator for operating the postage setting levers of a postal meter in accordance with output signals from a computing postal scale in an automated mailing system. The actuator includes drive shoes which engage the levers and are driven along linear paths generally parallel to the arcuate paths of the levers. The drive shoes are advanced and retracted by lead screws driven by stepping motors to move the levers in incremental steps substantially smaller than the distance between the operational lever positions. Position encoders provide signals indicative of the positions of the levers, and these signals are combined with the signals from the scale to control the operation of the actuator.

It is in general an object of the invention to provide a new and improved actuator for operating the levers of a postal meter in accordance with signals from a computing postal scale.

Another object of the invention is to provide an actuator of the above character in which the postal meter levers are driven along arcuate paths by shoes moving along linear paths.

Another object of the invention is to provide an actuator of the above character utilizing stepping motors and lead screws to move the levers in incremental steps.

Additional objects and features of the invention will be apparent from the following description in which the preferred embodiment is set forth in detail in conjunction with the accompanying drawings.

DESCRIPTION OF THE PREFERRED EMBODIMENT

Figure 1:
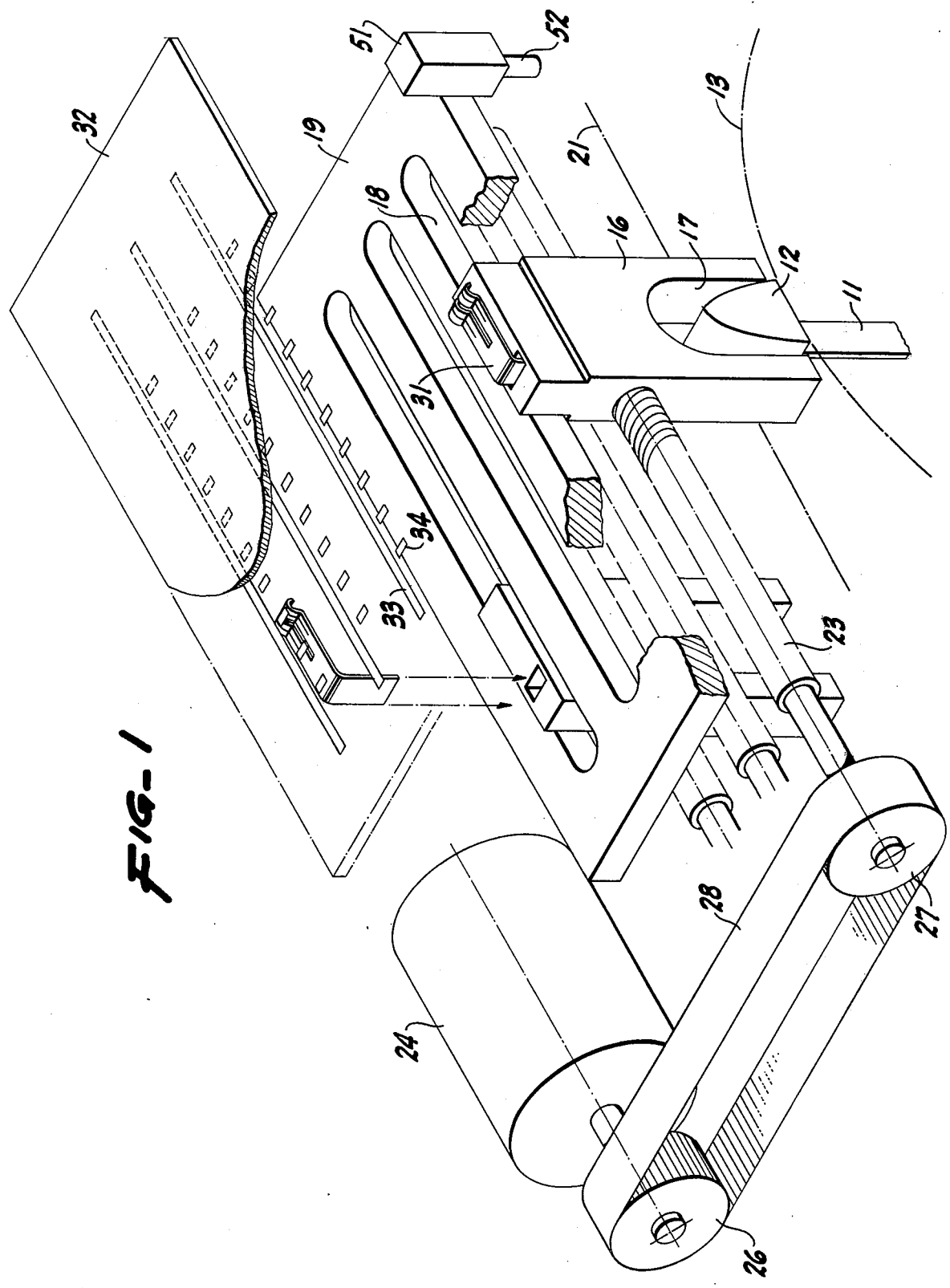
FIG. 1 is an exploded perspective view, largely schematic and partially broken away of one embodiment of a postal meter actuator incorporating the invention.

The actuator is particularly suitable for use with postal meters of the type having a plurality of arcuately movable postage setting levers. As illustrated in FIG. 1, such levers generally include an arm 11 having a knob or handle 12 at the outer end thereof. The lever arm generally extends through a slotted opening in the housing (not shown) of the meter, and the knob is accessible externally of the housing for movement along an arcuately curved path 13. One such lever is generally provided for each digit of postage, and a typical meter might include levers for the units, tens and hundreds digits. Each lever typically has ten operational positions, corresponding to the values 0–9, which are established by a detent mechanism in the meter. For clarity of illustration, only one lever and the portion of the actuator associated therewith are shown in FIG. 1. It will be understood, however, that any desired number of levers can be driven, the drive mechanism being the same for each.

The actuator includes a suitable framework and housing (not shown) by which the actuator can be removably mounted on a postal meter above the postage setting levers. For each of the levers, the actuator includes a drive shoe 16 having a downwardly opening socket 17 in which the operating knob 12 of the lever is received in driving relationship. The upper portion of the drive shoe is received in a longitudinally extending guide slot 18 formed in a stationary plate 19 to constrain the shoe for movement along a linear path 21. This path is coplanar with and generally parallel to arcuate path 13.

The drive shoe is driven along path 21 by a lead screw 23 rotatively mounted in suitable bearings (not shown). The lead screw is driven by a stepping motor 24 through pulleys 26, 27 and a drive belt 28. Pulleys 26, 27 are affixed, respectively, to the output shaft of the motor and to the lead screw, and belt 28 is a timing belt with lateral teeth trained about the pulleys. In the preferred embodiment, motor 24 is a reversible sychronous stepping motor having an angular advance of 15° per step. The pitch of lead screw 23, the ratio of pulleys 26 and 27, and the angular displacement of the drive motor are selected to move the drive shoe and lever in incremental steps substantially smaller than the distance between adjacent operational positions of the lever. In one presently preferred embodiment, the motor is energized by a 5 millisecond pulse train to provide 200 steps per second; the ratio of pulleys 26 and 27 is 1:1, and the pitch of the lead screw is six to one, i.e. six revolutions of the screw advance the shoe a distance of one inch. With these parameters, the shoe advances on the order of 0.007 inch per motor step, compared to a typical spacing on the order of 0.270 inch between successive lever detent positions.

Means is provided for sensing the position of lever 11 and providing an output signal corresponding thereto. This means comprises an encoder including an electrically conductive wiper 31 mounted on the top of block 16 and a printed circuit board 32 mounted above the block with contacts positioned to be engaged by the wiper. The contacts include a longitudinally extending common contact 33 and a plurality of position encoding contacts 34, the number of such contacts corresponding to the number of postage values for which the lever can be set. Contacts 34 are spaced longitudinally and positioned to be engaged when the lever is in the operational position for the amount of postage corresponding to the contact. In the embodiment illustrated, contacts 33, 34 are formed as conductors on printed circuit board 32, and connections to these contacts are made by leads and edge connectors (not shown) on the circuit board.

Figure 2:
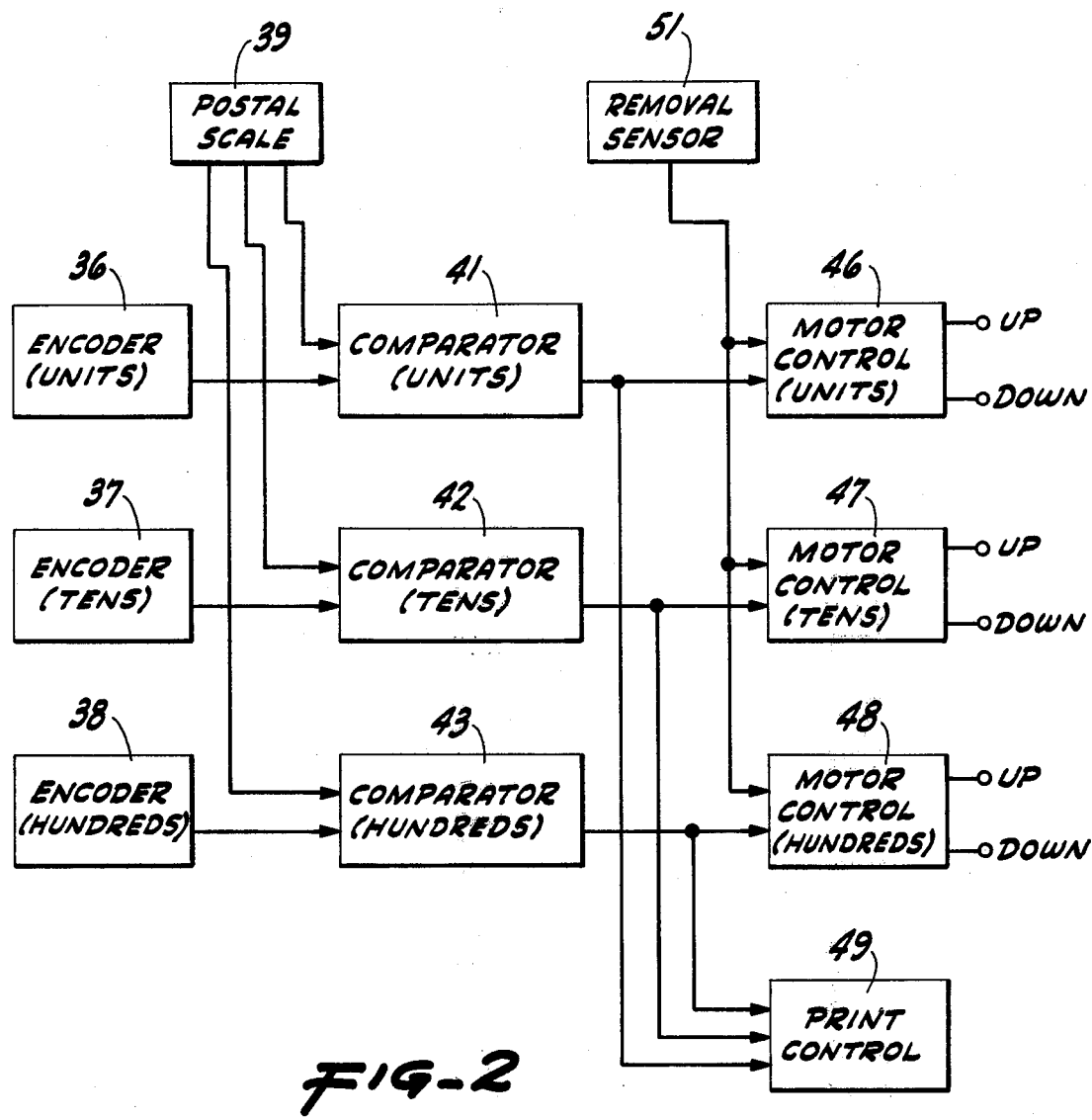
FIG. 2 is a block diagram of a control system for the actuator of FIG. 1.

Encoders 36–38 are provided for the units, tens and hundreds digits, respectively, and as illustrated in FIG. 2, the signals from the encoders are compared with signals from a postal scale 39 in comparators 41-43. The signals from the postal scale correspond to the desired positions of the levers, as represented by the postage to be applied, and the encoder signals represent the actual positions of the levers. The outputs of the comparators are applied to motor controls 46-48 which control the delivery of pulses to the stepping motors to move the levers in a direction tending to eliminate any difference between the encoder signals and the postal scale signals. When these signals coincide, the levers are in the desired position, and the print control 49 actuates the postage meter printer to print the desired postage.

Means is provided for sensing when the actuator is removed from the postal meter. This means includes a switch 51 mounted on the housing or frame of the actuator and having an armature 52 engaged by the postal meter. This switch is connected to motor controls 46-48 and conditions the controls to move the shoes to the zero postage positions in the absence of a postage meter under the actuator. With the shoes in this position and the levers moved manually to their zero positions, the actuator is readily remounted on the meter.

Operation and use of the postal meter actuator can now be described. It is assumed that the actuator is mounted on a postal meter having a plurality of levers engaged by the drive shoes of the actuator. Since the operation is similar for each lever, only the operation of the units lever will be described.

As drive pulses are applied to stepping motor 24, the output shaft of the motor advances in angular steps corresponding to the duration of the pulses. Lead screw 23 rotates accordingly, driving shoe 16 which, in turn drives lever 11 in incremental steps.

When lever 11 reaches the position corresponding to the desired amount of postage, wiper 31 will complete a circuit between common contact 33 and the corresponding position encoding contact 34. This condition is detected by comparing the output of the encoder with the output of the postal scale, and when the two outputs coincide, the stepping motor is deenergized. When all of the levers have reached their desired positions, the printer is actuated to print the postage.

The invention has a number of important features and advantages. It provides an interface between computing postal scales and postal meters and is suitable for use with a large number of postage meters already in existence. It requires no internal connections to or modification of the postal meter. The stepping motors and lead screws provide highly accurate positioning of the levers, and the linear movement of the drive shoes simplifies the design of the device.

It is apparent from the foregoing that a new and improved postal meter actuator has been provided. While only the presently preferred embodiment has been described, as will be apparent to those familiar with the art, certain changes and modifications can be made without departing from the scope of the invention as defined by the following claims.

What is claimed is:

1. In combination: a postage meter having a plurality of levers movable between positions spaced along a predetermined path for selecting different values of postage, and an actuator removably mounted on the postage meter for moving the postage setting levers, said actuator comprising individually movable drive shoes for engaging respective ones of the levers, means constraining the drive shoes for movement along a linear path generally parallel to the predetermined path, lead screws connected to the drive shoes for moving the shoes along the linear path when roatated, and motor means connected to the lead screws for rotating the screws to move the shoes.

2. The combination of claim 1 wherein the motor means includes a stepping motor and the shoes are moved in incremental steps smaller than the distance between adjacent ones of the positions along the path of the shoes.

3. The combination of claim 1 further including encoder means coupled to the drive shoes for providing electrical signals corresponding to the positions of the levers.

4. The combination of claim 3 wherein the encoder means comprises an electrically conductive wiper carried by each of the shoes, a longitudinally extending contact engaged continuously by the wiper, and a plurality of longitudinally spaced contacts positioned to be engaged successively by the wiper as the shoe moves along its path.

5. The combination of claim 3 together with means for providing a control signal corresponding to a predetermined position of each lever, means for comparing the control signal with the signal from the encoder means, and means responsive to a difference between the signals for actuating the motor means to move the lever toward the predetermined position.

6. In a lever actuator adapted to be removably mounted on a postage meter having a plurality of levers movable between a plurality of positions spaced successively along a predetermined path for selecting different values of postage: individually movable drive shoes for engaging respective ones of the levers, means constraining the drive shoes for movement along a linear path generally parallel to the predetermined path, lead screws connected to the drive shoes for moving the shoes along the linear path when rotated, and stepping motor means connected to the lead screws for rotating the screws to move the shoes in incremental steps smaller than the distance between successive ones of the lever positions.

7. The actuator of claim 6 further including means for sensing the positions of the levers and means responsive to the sensing means for actuating the stepping motor means to move the levers to predetermined ones of the lever positions.

8. In an actuator for moving a value setting lever along a predetermined path between predetermined positions corresponding to different values: a drive shoe for engaging the lever; means constraining the drive shoe for movement along a linear path in proximity to the path of the lever; a lead screw connected to the drive shoe for moving the shoe along the linear path; stepping motor means connected to the lead screw for rotating the screw to move the shoe in incremental steps substantially smaller than the distance between the predetermined positions; sensing means comprising an electrically conductive wiper carried by the shoe, an elongated contact extending along the linear path in continuous engagement with the wiper, and a plurality of individual contacts spaced along the linear path in position to be engaged by the wiper when the lever is in respective ones of the predetermined positions; and means responsive to the sensing means for actuating the stepping motor to move the lever to one of the predetermined positions.

9. In an actuator for a postage meter having a postage setting lever movable along a curvilinear path: a rotatively mounted lead screw extending along a stationary axis adjacent to the curvilinear path, a drive shoe for the lever mounted on the screw for lineal movement along the stationary axis, said shoe having a socket for receiving the lever in sliding engagement whereby the lever is free to move in the socket in a direction generally perpendicular to the axis as the distance between the curvilinear path and the stationary axis varies with the movement of the lever along the path, movitive means for rotating the screw to drive the shoe along the axis, an electrically conductive wiper carried by the shoe, an elongated contact generally parallel to the screw and engaged by the wiper, a plurality of individual contacts spaced along the screw in position to the engaged by the wiper when the screw is in predetermined positions, and means connected to the wiper for actuating the motive means to move the lever to a predtermined position along its path.

* * * * *